US007971217B2

(12) United States Patent
Masumitsu et al.

(10) Patent No.: US 7,971,217 B2
(45) Date of Patent: Jun. 28, 2011

(54) CONTENT DIGEST SYSTEM, VIDEO DIGEST SYSTEM, USER TERMINAL, VIDEO DIGEST GENERATION METHOD, VIDEO DIGEST RECEPTION METHOD AND PROGRAM THEREFOR

(75) Inventors: Ken Masumitsu, Yamato (JP); Tomio Echigo, Yokohama (JP); Takaaki Murao, Yokohama (JP); Masayoshi Teraguchi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1707 days.

(21) Appl. No.: 10/081,274

(22) Filed: Feb. 21, 2002

(65) Prior Publication Data

US 2002/0157095 A1 Oct. 24, 2002

(30) Foreign Application Priority Data

Mar. 2, 2001 (JP) .................................. 2001-58807

(51) Int. Cl.
*H04N 5/445* (2006.01)
(52) U.S. Cl. ................ 725/46; 725/34; 725/36; 725/45; 725/47; 725/48
(58) Field of Classification Search ................ 725/9, 34, 725/36, 45–48
See application file for complete search history.

(56) References Cited

U.S. PATENT DOCUMENTS

| | | | | |
|---|---|---|---|---|
| 5,410,344 A | * | 4/1995 | Graves et al. | 725/46 |
| 5,619,410 A | * | 4/1997 | Emori et al. | 704/7 |
| 5,758,257 A | * | 5/1998 | Herz et al. | 725/116 |
| 6,366,296 B1 | * | 4/2002 | Boreczky et al. | 715/719 |
| 6,408,128 B1 | * | 6/2002 | Abecassis | 386/68 |
| 7,028,325 B1 | * | 4/2006 | Rui et al. | 725/37 |
| 2002/0104093 A1 | * | 8/2002 | Buehl et al. | 725/98 |
| 2005/0172318 A1 | * | 8/2005 | Dudkiewicz et al. | 725/46 |

OTHER PUBLICATIONS

Hashimoto et al., "Digested TV Program Viewing Application Using Program Index," ITE Technical Report, vol. 23, No. 28, pp. 7-12 (Mar. 24, 1999).
"Transcoding Contents," Nikkei Electronics, No. 770, pp. 165-176 (May 22, 2000).

* cited by examiner

*Primary Examiner* — Hunter B. Lonsberry
*Assistant Examiner* — Sumaiya A Chowdhury
(74) *Attorney, Agent, or Firm* — Ryan, Mason & Lewis, LLP

(57) ABSTRACT

Meta data about content is converted into characteristic values. Each characteristic value is associated with one or more content segments of content. The content can be audio, video, or other data or combinations of data. Importance levels for content segments are determined from content scores. Content scores are generally an indication of how one person would rate a particular characteristic value. The content scores may be estimated by using previously determined scores of similar content segments. The similarity is preferably determined by a particular metric. A user may also supply his or her own content scores for content segments. The user profile content scores can be combined with the determined content scores or completely supplant these scores. Based on the importance levels for content scores for content segments, content segments may be packaged into a content digest that a user may view.

17 Claims, 12 Drawing Sheets

FIG. 11

META DATA CHARACTERISTIC VALUE DB (33)

- x_1 ANCHORMAN M OF TEAM A
- x_2 ACE PITCHER U OF TEAM A
- x_3 PLAYER S OF TEAM B
- x_4 PITCHER H OF TEAM B
- x_5 STRIKE-OUTS
- x_6 HITS
- x_7 HOME RUNS

CONTENT : THIRTEENTH GAME BETWEEN TEAM A AND TEAM B (31)

CONTENT FREQUENCY (36)

| CFreq |
|---|
| cf_1 = 5 |
| cf_2 = 7 |
| cf_3 = 4 |
| cf_4 = 5 |
| cf_5 = 12 |
| cf_6 = 8 |
| cf_7 = 2 |

CONTENT SCORE (37)

| CScore_1 | CScore_2 |
|---|---|
| cs_11 = 0.8 | cs_21 = 0.1 |
| cs_12 = 0.7 | cs_22 = 0.1 |
| cs_13 = 0.2 | cs_23 = 0.9 |
| cs_14 = 0.1 | cs_24 = 0.9 |
| cs_15 = 0.4 | cs_25 = 0.7 |
| cs_16 = 0.4 | cs_26 = 0.4 |
| cs_17 = 0.9 | cs_27 = 0.7 |

— CONTENT SCORE FOR TEAM B
--- CONTENT SCORE FOR TEAM A

GENERATION PROBABILITY

- p(x_1) = 5/43
- p(x_2) = 7/43
- p(x_3) = 4/43
- p(x_4) = 5/43
- p(x_5) = 12/43
- p(x_6) = 8/43
- p(x_7) = 2/43

$$P(x_1) = \frac{cf_1}{\sum_{i=1}^{7} cf_i}$$

IN THIS CASE, THE SIMULTANEOUS GENERATION PROBABILITY USED FOR THE IMPORTANCE LEVEL CALCULATION EXPRESSION IS AS FOLLOWS

THE SIMULTANEOUS GENERATION PROBABILITY IS

P(x_1, x_2) = P(x_1)*P(x_2) = 35/1849
P(x_4, x_7) = P(x_4)*P(x_7) = 10/1849
P(x_1, x_3, x_6) = P(x_1)*P(x_3)*P(x_6) = 160/79507

CONTENT DIGEST SYSTEM, VIDEO DIGEST SYSTEM, USER TERMINAL, VIDEO DIGEST GENERATION METHOD, VIDEO DIGEST RECEPTION METHOD AND PROGRAM THEREFOR

FIELD OF THE INVENTION

The present invention relates to a content provision technique for providing content, such as video, for a client, and relates in particular to a content digest system for efficiently digesting an enormous amount of content.

BACKGROUND OF THE INVENTION

Recently, in order to provide global service and multimedia communication service, early introduction has been planned for the next-generation portable telephones. These next-generation telephone employ IMT-2000 (International Mobile Telecommunications 2000, a standard by the International Telecommunication Union), the next-generation mobile communication system. For a next-generation portable telephone supporting IMT-2000, a maximum bandwidth of 2 Million bits per second (Mbps) is provided, and the provision of a video distribution service is also planned as an application. However, using a portable telephone to view video for an extended period of time is difficult for a variety of reasons, including device limitations, such as device sizes and resolutions, and communication fees.

Therefore, a system is required whereby a content digest, representative of the enormous amount of video data required for the presentation of the digest, is needed. For example, according to MPEG-7 (the seventh version of a standard created by the Motion Pictures Expert Group), in order for a high-speed search engine to be used for multimedia data, the standardization of meta data must have progressed to the point that descriptive audio/visual data specifications can be used as search keywords.

The simplest system for generating a video digest using meta data is to employ a method whereby, before the video digest is prepared, a search is performed in a period wherein meta data pertinent to query data are present. However, since such a system can perform only a binary operation for attesting to the presence of pertinent meta data, no priority can be assigned to the search results, even when multiple data set queries are processed.

According to another system for preparing a rule appropriate for a video domain and for calculating an importance level in accordance with rules for the generation of a video digest (see "Digest Audio System for a TV Reception Terminal," Transaction of Information Processing Society of Japan, Vol. 41, No. SIG3 (TOD 6), the disclosure of which is hereby incorporated by reference), an additional technique is available for preparing a video digest meta data. This technique employs a similarity between a user profile and a characteristic of the "tf.idf" method for weighting words. For a description of the tf.idf, see "Automatic Construction of Personalized TV News Programs," Association of Computing Machinery (ACM) Multimedia Conf., 323-331 (1999), the disclosure of which is hereby incorporated by reference.

However, according to the above technique for calculating a rule-based importance level and preparing a video digest, a personally prepared importance level calculation rule must be devised in advance and used for calculating an importance level for structured meta data using tags. Thus, a load is imposed on a user for the provision of structured meta data and for the generation of importance level calculation rules for each domain. In addition, according to the method employed for preparing a video digest using the similarity to a user profile, results cannot be obtained unless a satisfactory amount of meta data is available.

Furthermore, since currently a content provider must manually prepare all video digests, a great deal of labor is required, and generating digests appropriate to the demands of a variety of audiences is difficult. Even when progress in content standardization has been achieved, not all contents include meta data wherein a scene is described in detail. Moreover, a described scene is not always represented by a closed caption that displays subtitle data or text that has been obtained using speech recognition.

Specifically, using video as an example, a video digest technique is required to enable users to efficiently view and listen to the enormous amount of video content that is available. However, at the present, there is no alternative to viewing and listening to material prepared by content providers, and video digest content representative of individual preferences is not available for those users whose preferences differ. In order to prepare digests consonant with individual preferences, there is a method that can be used that involves the gathering of data covering individual tastes and then constructing, from this data, detailed user profiles that can be employed to prepare optimal video digests for individual users. However, since generally much time and labor are required to acquire the data for even one user profile, constructing detailed profiles for all users is not practical because of the huge work load involved.

Thus, there is a need to overcome the obstacles of a large work load for constructing detailed profiles for each user and for providing content digests, yet provide each user with some type of profile and a content digest tailored to the user.

SUMMARY OF THE INVENTION

To resolve the above technical shortcomings, techniques of the present invention automatically generate, from content, several typical kinds of content digests. Additionally, techniques of the present invention enable the selection of digests that correspond to users' preferences, even when the reliability of user profiles is low. Furthermore, techniques of the present invention provide individually appropriate digests by combining user scores from user profiles and scores of similar content from similar users. Aspects of the present invention can determine a digest solely from a user profile, from a combination of a user profile and scores for similar content, or solely from scores of similar content.

Broadly, meta data, which preferably includes remark data that describe the content, is converted into characteristic values, which are generally keywords. Each characteristic value is associated with one or more content segments of content. The content can be audio, video, or other data or combinations of data. The content segments are portions of the content, such as a scene from an athletic contest. Importance levels for content segments are determined from content scores. Content scores are generally an indication of how one person would rate a particular characteristic value. The content scores may be estimated by using previously determined scores of similar content segments, which is beneficial when current content or a current content segment has never been viewed by a particular user. The similarity is preferably determined by a particular metric. A user may also supply his or her own content scores for content segments. The user profile content scores can be combined with the determined content scores or completely supplant the determined content scores.

Based on the importance levels for content scores for content segments, content segments may be packaged into a content digest that a user may view. Consequently, a content digest can be made completely through user preferences, completely through estimations of a user's preferences, or through some combination of the two.

A more complete understanding of the present invention, as well as further features and advantages of the present invention, will be obtained by reference to the following detailed description and drawings.

BRIEF DESCRIPTION OF THE DRAWINGS

FIG. 11 contains a diagram showing a meta data characteristic value database, and a content frequency and a content score in content data, in accordance with a preferred embodiment of the invention.

DETAILED DESCRIPTION OF PREFERRED EMBODIMENTS

Figure 1:
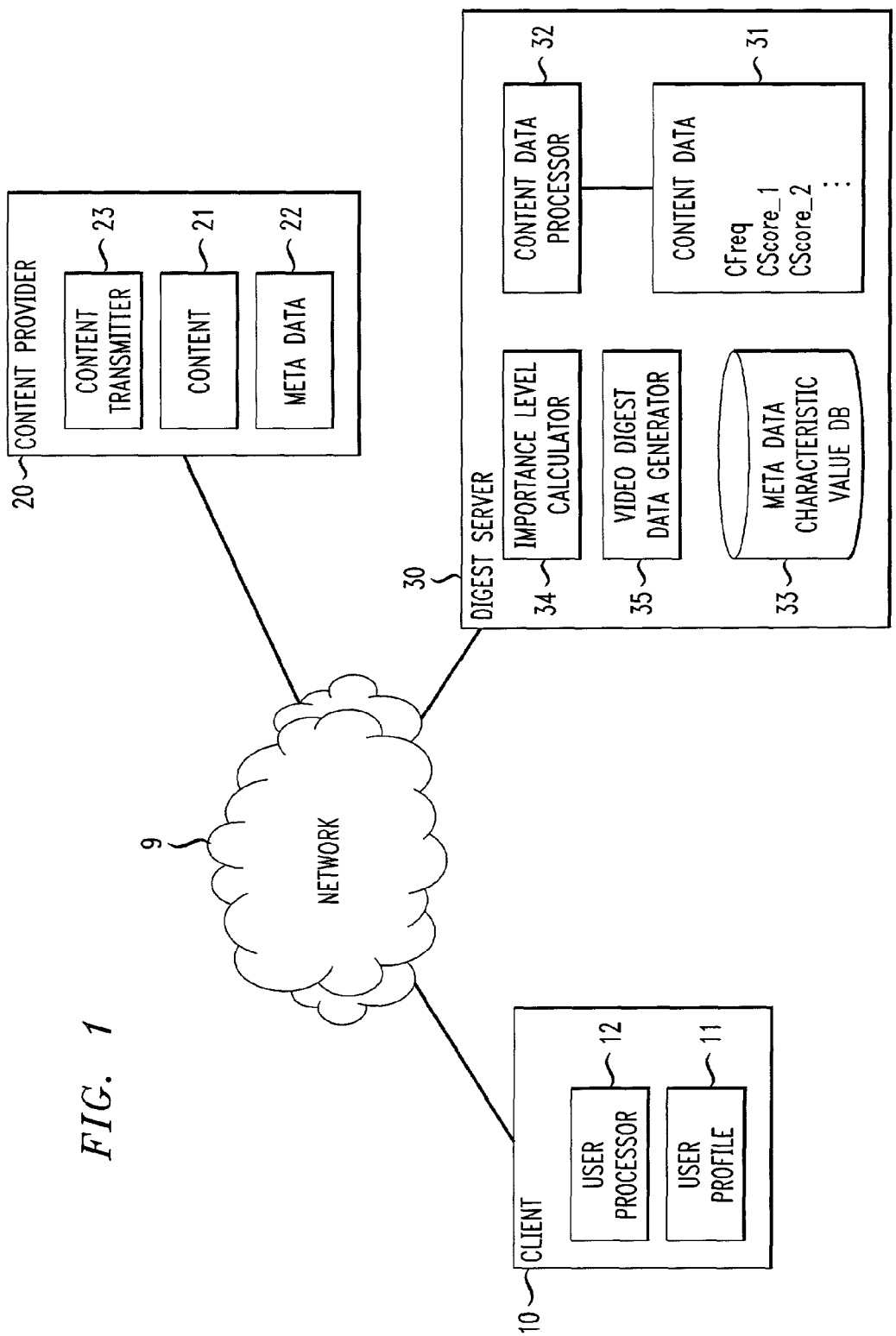
FIG. 1 is a schematic diagram for explaining a possible configuration of a network system according to one embodiment of the invention.

Preferred embodiments of the present invention will now be described in detail, while referring to the accompanying drawings. FIG. 1 is a schematic diagram showing the configuration of a network system according to the embodiment. A network system used for the exemplary embodiment of FIG. 1 comprises the following: a network 9, such as the Internet; a client 10, which is a user terminal for receiving digested content; a content provider 20, for providing content; and a digest server 30, for digesting content provided by the content provider 20. The client 10, the content provider 20 and the digest server 30 may comprise a single or multiple computers. Either wired or wireless means may be used for communication among the components, and a portable telephone or a PDA (Personal Digital Assistant), for example, can be used as the client 10. Further, video data is used as content throughout the present description, but so long as a time series is used for the changing of content, the embodiments of the present invention can handle not only video content but also music data.

The client 10 includes a user profile 11, for storing a characteristic value, such as a keyword, as information that helps to allow a user to enter personal preferences; and a user processor 12, for receiving a content score generation instruction from a user, which sets an initial value for the user profile 11, and for correcting the content score in accordance with the audio/visual state or a predetermined user operation. The user processor 12 includes a function for providing a content digest for a user. The functions provided for the user terminal, the client 10, can be obtained, for example, by downloading a function program from a server at a remote site. Software for these functions may also be bundled for sale with a user terminal.

The content provider 20 includes the following: content 21, such as video data or music data; meta data 22 describing the content 21, e.g., where the meta data includes remark data that describes a scene or musical passage and the beginning and end times for the scene or musical passage; and a content transmitter 23, for transmitting a video digest or the meta data 22 via the network 9.

The digest server 30 includes the following: content data 31, including a content frequency data and a content score; a content data processor 32, performing a process, such as for calculation of the frequency indicating how many times a characteristic value appears in the meta data 22, for the content data 31; a meta data characteristic value database (DB) 33, for storing meta data characteristic values prepared for all domains; an importance level calculator 34, for calculating an importance level for each set of contents 21; and a video digest data generator 35, for preparing information for a video digest, which is the digested content.

The user processor 12 transmits, to the importance level calculator 34, the user profile 11 and a content score and a video digest time for selected content 21. Thereafter, the importance level calculator 34 issues a video digest transmission instruction to the content transmitter 23, to which the video digest data generator 35 transmits video digest data. The content transmitter 23 then transmits, to the user processor 12, the video digest and the meta data 22. The content transmitter 23 also transmits, to the content data processor 32, a list of user profile content scores concerning the content 21. It should be noted, however, that when the content score is generated by the digest server 30, this transmission is not required. Content scores generated by the digest server 30 will be called determined content scores herein. The user processor 12 transmits the user profile 11 to the content data processor 32, and, while the content 21 is being viewed and heard, the client 10 registers the user profile 11 by registering the user's favorite scenes. Then, after the viewing and listening have been completed, the user profile 11 is updated.

Figure 2:
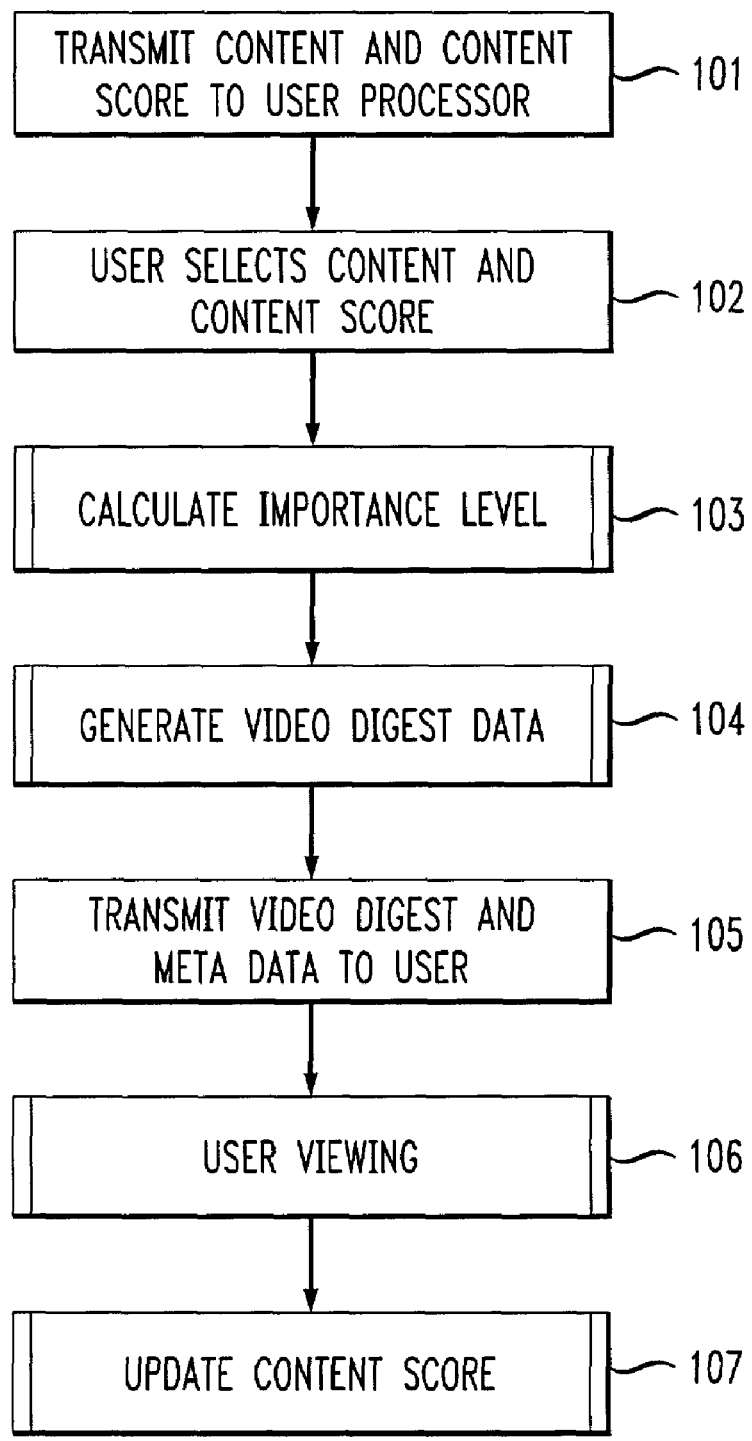
FIG. 2 is a flowchart showing the overall user viewing process performed by a client, in accordance with a preferred embodiment of the invention.

FIG. 2 is a flowchart showing the general processing performed when the user at the client 10 is concentrating on the content 21. First, the content data processor 32 of the digest server 30 transmits, to the user processor 12 of the client 10, the available contents 21, any determined content scores and the content list (step 101). The user, who is the client 10, transmits, to the importance level calculator 34 of the digest server 30, a selected content 21 and the user profile content scores thereof (step 102). Thereafter, the importance level calculator 34 calculates the importance level for each scene using the selected determined content score and the received user profile 11 (step 103), which contains the user profile content scores. Meanwhile, the video digest data generator 35 of the digest server 30 employs the obtained importance levels for generating video digest data having the video digest time length (step 104).

The content transmitter 23 of the content provider 20 transmits the video digest and the meta data 22 to the client 10 (step 105), and the user, who is the client 10, views and listens to the video digest (step 106). During step 106, the user can select or deselect his or her favorite scenes or songs, or can change the user profile content score of any scenes or songs. After the user has viewed and listened to the video digest, the user profile 11 is updated, and the updated user profile 11 is transmitted to the content data processor 32 of the digest. Thereafter, the content data processor 32 updates the content score based on the user profile 11 of the pertinent user (step 107).

Figure 3:
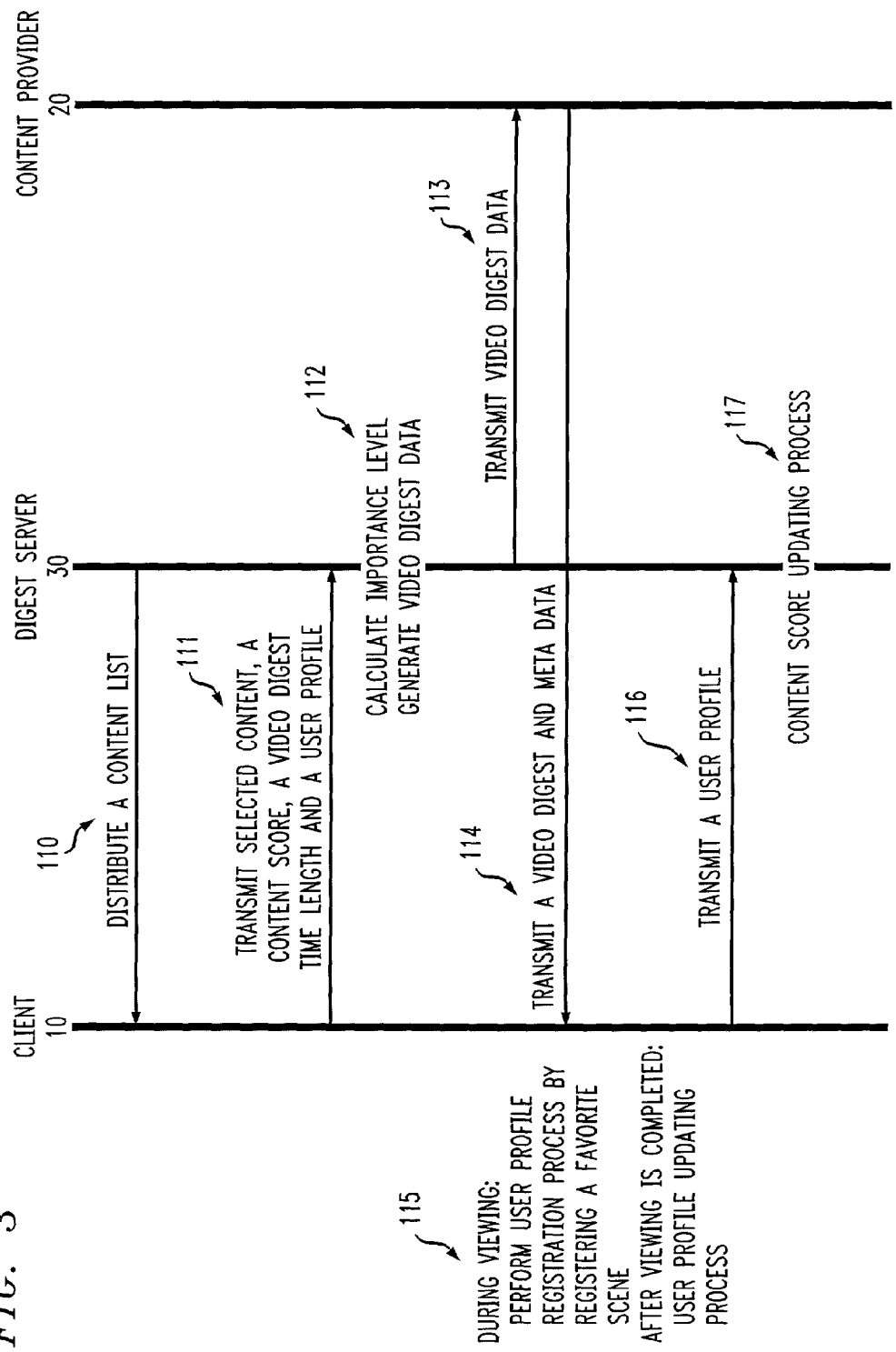
FIG. 3 is a diagram showing the distribution processing performed by the network system, in accordance with a preferred embodiment of the invention.

FIG. 3 is a diagram showing an exemplary distribution processing, performed by the network system in this embodiment, wherein the above described operation is arranged. First, the digest server 30 distributes a content list to the client 10 (step 110). The content list includes not only content 21 names but also determined content scores stored in the content data 31. The client 10 transmits the selected content 21 (e.g., the thirteenth game for team A and team B), the determined content score (e.g., a score of scene where team A scored, a score of the scene where the anchorman M hit a home run), the video digest time length (e.g., two and half hours compressed to 15 minutes), and the user profile 11 (step 111). Thereafter, the digest server 30 calculates the importance level and generates video digest data (step 112), and transmits the video digest data to the content provider 20 (step 113). The content provider 20, for example, generates an actual video digest based on the received video digest data, and transmits, to the client 10, the video digest and the meta data 22 (step 114). The client 10 registers the user profile 11, by registering the user's favorite scenes, while the user is viewing and listening to the video digest, and, after the viewing has been completed, the client 10 updates the user profile 11 (step 115) Thereafter, the updated 14 user profile 11 is transmitted to the digest server 30 (step 116), which then updates the determined content score (step 117) using user profile content score in the user profile 11.

Figure 4:
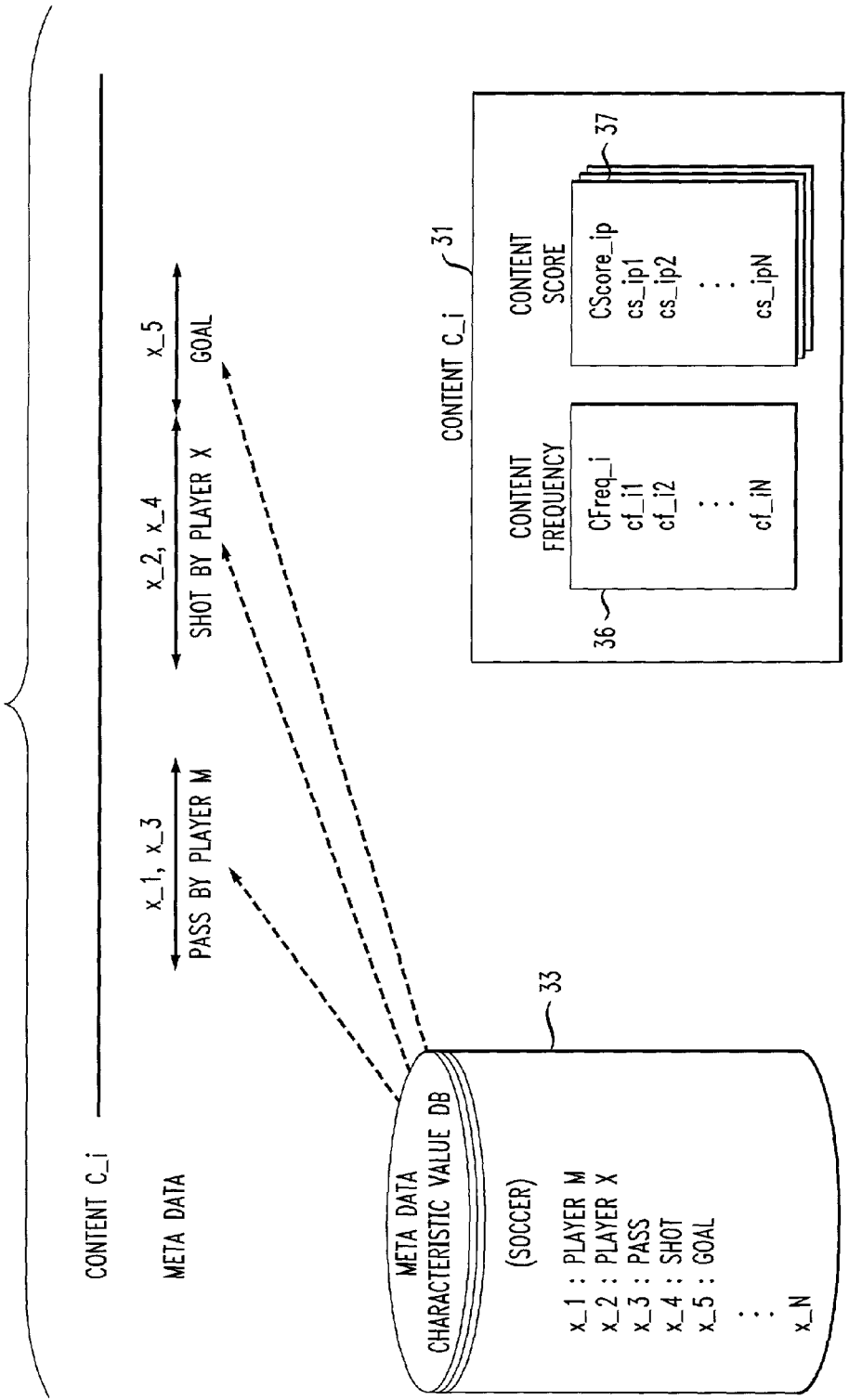
FIG. 4 is a diagram for explaining information and content data stored in a meta data characteristic value database of a digest server, in accordance with a preferred embodiment of the invention.

FIG. 4 is a diagram for explaining the content data 31 and the data stored in the meta data characteristic value database 33 of the digest server 30. The meta data 22, which is provided for content, is constituted by remark data, for example, which describes a scene and head and end times of the scene. The head and end times define the effective range of the scene. First, by using the meta data characteristic value database 33 prepared for each domain, the remark data, which describes each scene and preferably each content segment, is converted into a characteristic value. A keyword is preferably used as the characteristic value and is registered in advance in the meta data characteristic value database 33. In this embodiment of FIG. 4, N keywords, such as players M and X, a pass, a shot, and a goal, are registered in the meta data characteristic value database 33. The remark data that is not registered in the meta data characteristic value database 33 is not converted into a characteristic value. It should be noted that the domain indicates the category of the video content 21, such as soccer or baseball.

The content data 31 includes a content frequency (CFreq) 36 that represents the frequency where the characteristic value appears in the content 21. Since, to determine the content frequency 36, the keyword in the meta data 22 of the content 21 is used, the content 21 is employed to uniformly determine the content frequency 36. For example, assume that the content frequency 36 of the i-th content is represented as the following:

$$CFreq\_i = (cf\_i1, \ldots, cf\_iN).$$

The content frequency 36 is defined by the number of times where the keyword appears and the period of time the keyword appears during a time unit.

The content data 31 also includes a determined content score 37 that represents the importance level of the characteristic values in the content 21. Even for the same content 21, the determined content score for the characteristic values differs depending on the user. For example, in a professional baseball game between team A and team B, the importance level of the characteristic value of the anchorman or the ace pitcher of team A is high for a team A fan, while this importance level is not high for a team B fan. Therefore, each content 21 has a different number of content scores 37 in accordance with a variance in the preferences of the audience group or user group. In this case, the p-th determined content score 37 of the i-th content is represented as the following:

$$CScore\text{-}ip = (cs\text{-}ip1, \ldots, cs\text{-}ipN).$$

As will be described later, the video digest is generated in accordance with the video importance level, which is prepared based on a value that is weighted by the content score 37 and a user profile score. Thus, the video importance levels can be obtained from sets of the content scores 37 and the user profiles, and the video digest can be prepared by using the obtained video importance levels.

For a client 10 for whom a high-quality user profile 11 is held, a personal video digest can be prepared without using the content score 37, but with, instead, using solely a user-provided client score. However, since high-quality user profiles 11 are not always held for all clients 10, in certain embodiments of the present invention, the video importance levels are calculated using the determined content scores 37 to generate the video digests. Further, when user profiles 11 are held for clients 10 having similar interests, and a determined content score 37 is included in other, similar content, these are employed to prepare multiple determined content scores 37 for the individual contents. Consequently, multiple typical video digests can be generated. Then, since a client 10 can select from among multiple, previously prepared video digests, the client 10 can select and view an appropriate one.

It should be noted, however, that it is generally difficult to generate a determined content score 37 each time a content 21 is prepared. Therefore, in one embodiment, both the data for a user (i.e., the user profile content scores) who views certain content 21 and the content scores 37 for content 21 are employed to prepare an estimated content score 37 for pertinent content 21. The estimation process for preparing a determined content score 37 roughly includes the use of an initial setting and an update process. For the initial setting, a determined content score 37 for new content C_[C+1] is calculated using a value that is similar to that of other, conventional contents (e.g., past contents), C_1 to C_C. Then, during the update process, the user profile 11 held for a user who views the video digest is employed.

Figure 5:
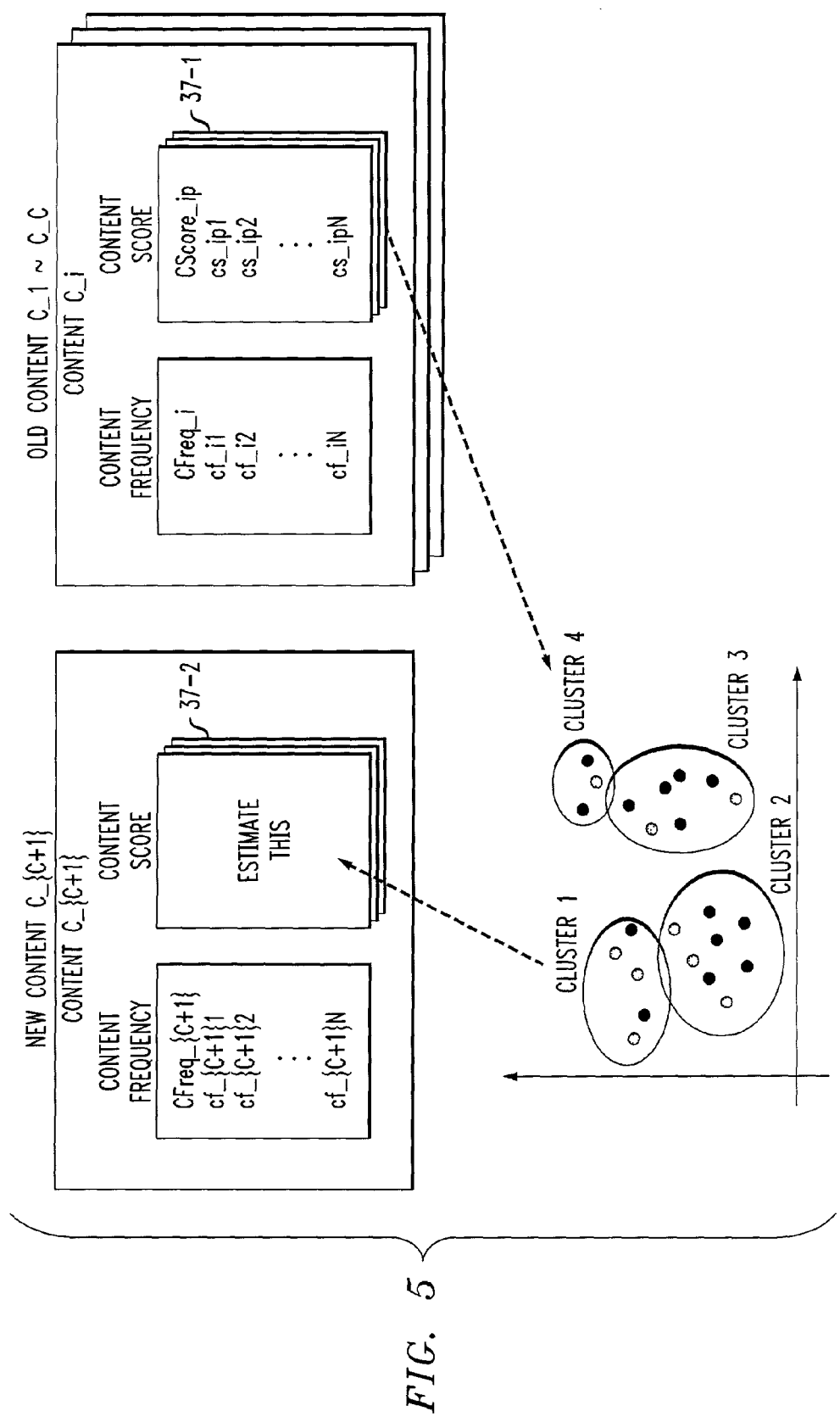
FIG. 5 contains diagrams for explaining, as an initial setting, the processing for generating a new content score by using previously accumulated content scores, in accordance with a preferred embodiment of the invention.

FIG. 5 is a diagram for explaining the initial setting processing for generating a new determined content score using determined content scores generated in the past. FIG. 5 contains a diagram showing old contents C_1 to C_C, having old determined content scores 37-1, and showing new contents C_[C+1], having new determined content scores 37-2. FIG. 5 also contains a diagram for explaining the state wherein all the determined content scores 37 of all the contents 21 are plotted in N-dimensional space. A simple two-dimensional space is shown, and the density of dots may be used to represent the weight (e.g., based on a similarity measure) assigned to sets of individual dots. Thus, as a similarity expressed by dot density is increased, weighting is likewise increased.

First, when new content C_[C+1] is obtained, the following method, for which contents C_1 to C_C that were previously accumulated, is used to estimate the initial determined content score to be employed for the new content. Since it is assumed that a user's preferences are the same for similar content 21, the content frequency (CFreq) 36 is employed to calculate similarities between the new content C_[C+1] and each of the old contents C_1 to C_C. These similarities are calculated using the following cosine function.

Similarity between content frequencies CFreq_i and CFreq_j is as follows:

$$Simi1(CFreq\_i, CFreq\_j) = 1 - |Cos^-((CFreq\_i \cdot CFreq\_j)/(\|CFreq\_i\| \cdot \|CFreq\_j\|))|,$$

where $$CFreq\_i \cdot CFreq\_j = \sum_{k=1}^{N} cf\_ik * cf\_jk$$

$$\|CFreq\_i\| = sqrt\left(\sum_{k=1}^{N} cf\_ik * cf\_ik\right)$$

The old contents C_1 to C_C have one or more determined content scores 37, and all the determined content scores 37 are represented as dots in the N-dimensional characteristic space shown in FIG. 5, wherein, for each dot, similarity is used for weighting. For example, when the similarity obtained between CFreq_[C+1] and CFreq_i using the cosine function is Simi1(C_[C+1], C_i), the content scores CScore_i1, CScore_i2, . . . , which belong to content C_i, are plotted as points having weight Simi1(C_[C+1], C_i). As is described above, the weight is represented by the density of a dot, for example. In this embodiment, hereinafter the old content scores 37-1 are clustered, and a representative value for each cluster is used as a new content score 37-2. A representative value that, for example, occupies the center of a cluster obtained by clustering can be used as an initial content score.

The process for updating a determined content score 37 will now be described. When user U_j is a client 10 who has viewed content C_i, the determined content score 37 is corrected by using the user profile content scores in user profile 11 for user U_j. When there are multiple determined content scores 37, a user updates the determined content score 37 for a desirable video digest by viewing the content and by providing his or her user profile content score. This updating process should be performed not only when content is viewed by a specific client 10, but at all times at which the content is viewed. Assume that user U_j selects the p-th content score C_i.

A determined content score is performed as follows:

$$CScore\_ip = (cs\_ip1, \ldots, cs\_ipk, \ldots, cs\_ipN).$$

The user profile is performed as follows:

$$UProf\_j = (u\_j1, \ldots, u\_jk, \ldots, u\_jN)$$

Updating an old determined content score to a new determined content score, by using a user profile content score, is performed as follows:

$$cs\_ipk = \alpha * cs\_ipk + (1-\alpha) * u\_jk, \text{ if } (u\_jk != 0),$$

$$cs\_ipk = cs\_ipk, \text{ otherwise,}$$

where $0 \leq \alpha \leq 1$. The symbol α denotes a parameter for the updating of the content score 37 using the user profile of a user who views the content. Since the value assigned to α is generally small, the influence of the user profile UProf_j is increased.

When multiple determined content scores 37 are present, multiple video digests can be prepared, and in this case, a selection index should be provided for a user. While the content provider 20 scans the determined content scores 37, a person can provide an appropriate title; however, in this case, a large load is imposed on the person involved. Therefore, upper R characteristic values having greater scores should be selected from the content scores 37 and presented as keywords.

The estimation (learning method) process employed for a user profile 11 will now be described. The user profile 11 is represented as UProf_j=(u_j1, . . . , u_jN), ($0 \leq u\_jk \leq 1$). It should be noted that for each domain a different user profile 11 may be used. In the process performed when estimating the user profile 11, first, following the initialization (u_jk=0, for all k), a favorite scene is registered by depressing a favorite registration button, for example, and a forgetting process is preferably performed when the viewing has been completed. During the initialization process, the initial value UProf_j=(0, . . . , 0) is entered in the user profile 11. Then, for registration of a favorite scene, when, while viewing a video, a user encounters a favorite scene, he or she depresses, for example, a web browser favorite scene registration button, and sets to 1 (an importance level of 1), the value of a user profile content score that corresponds to the one or more characteristic values included in the selected scene (u_jk=1). However, since user preferences tend to change as time elapses, each time a user has completed the viewing of content, the user profile content score, corresponding to a characteristic value, in the user profile 11 is preferably updated. For example, when a user does not view a scene wherein the characteristic of the registered meta data is present, in the user profile content score, corresponding to the characteristic value of the pertinent meta data, is reduced. Whereas, if the user views the scene in question, the value of the user profile content score of the meta data characteristic is increased. In other words, a user profile content score is not updated if it corresponds to a characteristic value that is not registered. That is, during a forgetting process, when there are no scenes wherein the registered characteristic is included, the user profile content score of the characteristic value approaches 0, and when such a scene is present, the user profile content score of the characteristic value approaches 1.

For updating a user profile content score of a characteristic value that is registered in the user profile 11, when meta data x_i is present, even at a single location in a portion viewed by the user:

$$u\_jk = f(u\_jk) = \beta * (1 - u\_jk) + u\_jk, \quad (3)$$

in other cases:

$$u\_jk = g(u\_jk) = \beta^2 * u\_jk, \quad (4)$$

where $0 \leq \beta \leq 1$. The symbol β denotes a parameter representing the attenuation rate (also called the forgetting rate) for a preference, and as the value allocated for β becomes smaller, the attenuation rate (the forgetting rate) increases. When a user is to edit a user profile 11, a registered characteristic value (a keyword) is displayed to permit its correction by the user. That is, the user is permitted to perform an alternative process to indicate whether the characteristic value is registered, and whether the sequential process is to be internally performed by the system.

Figure 6:
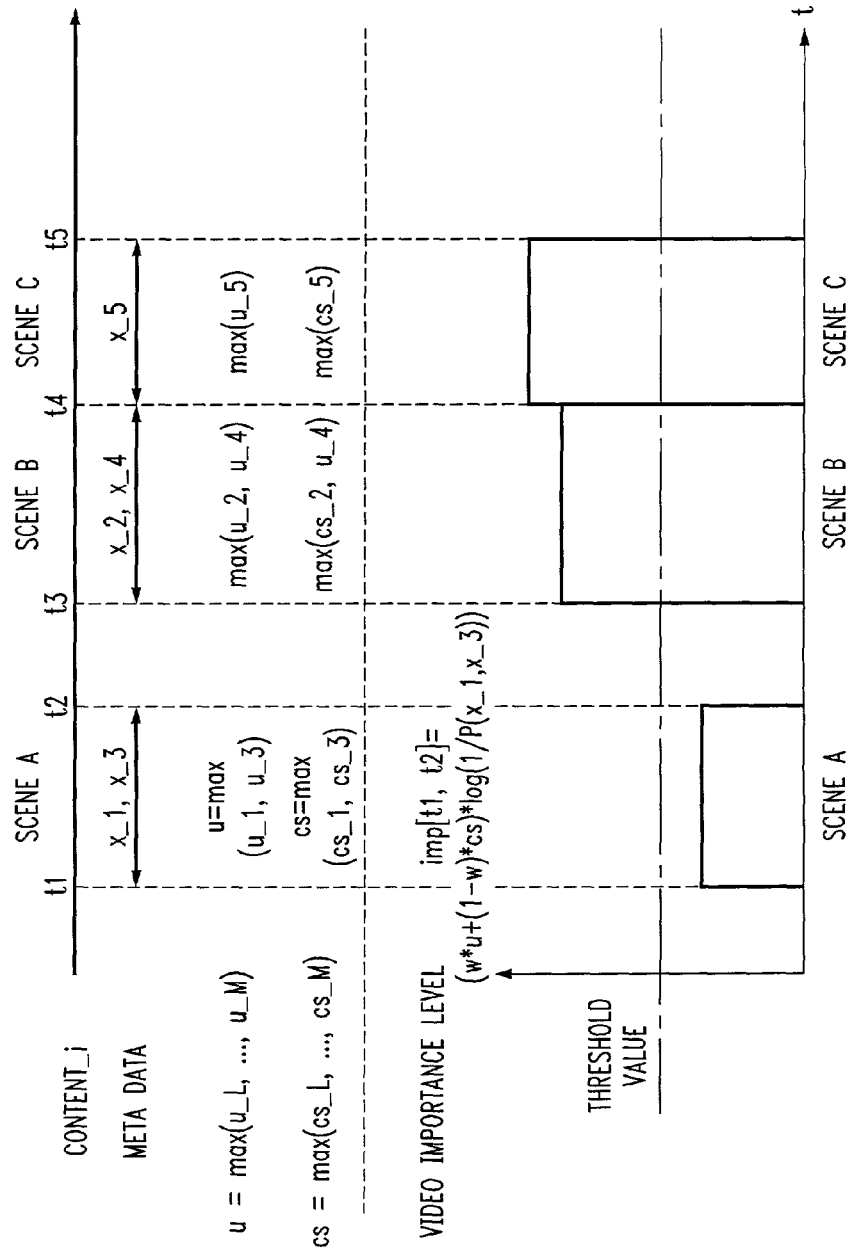
FIG. 6 contains explaining the processing for obtaining a video importance level by using a content score and a user profile, in accordance with a preferred embodiment of the invention.

An explanation will now be given for a process at step 103 in FIG. 2 for calculating an importance level. FIG. 6 contains a diagram for explaining the processing for obtaining a video importance level by using content scores 37 and a user profile 11. As is shown in the example in FIG. 6, meta data characteristics (x_1, x_3) for content (Content_i) to be processed are present for a scene A at times [t1, t2]. Similarly, meta data characteristics (x_2, x_4) are present for a scene B at times [t3, t4], and a meta data characteristic (x_5) is present for a scene C at times [t4, t5]. Further in this example by using the max function, an overall user profile content score is defined as u=max(u_L, . . . , u_M), or the maximum of individual user profile content scores. Additionally, the overall determined content score 37 is defined as cs=max(cs_L, . . . , cs_M), or the maximum of individual determined content scores. The overall user profile content score and the overall determined content score are respectively represented as u=max(u_1, u_3) and cs=max(cs_1, cs_3) for scene A, u=max(u_2, u_4) and cs=max(cs_2, cs_4) for scene B, and u=max(u_5) and cs=max(cs_5) for scene C.

As is shown in FIG. 6, when a simultaneous generation probability P is defined as (x_1, x_3) and a weight is defined as w, the video importance levels imp[t1, t2] for scene A at times [t1, t2] is represented as the following:

$$imp(t1,t2) = (w*u+(1-w)*cs)*\log(1/P(x\_1,x\_3)).$$

The importance levels for the other time intervals are calculated in the same manner. The graph shown in FIG. 6, for example, is prepared to represent the obtained video importance levels. The threshold value can be acquired by entering the time length for a video digest desired by a user. With this threshold value, scenes B and C, the values of which exceed the threshold value, are selected in the example in FIG. 6, and the video digest is constituted by Scenes B and C.

Figure 7:
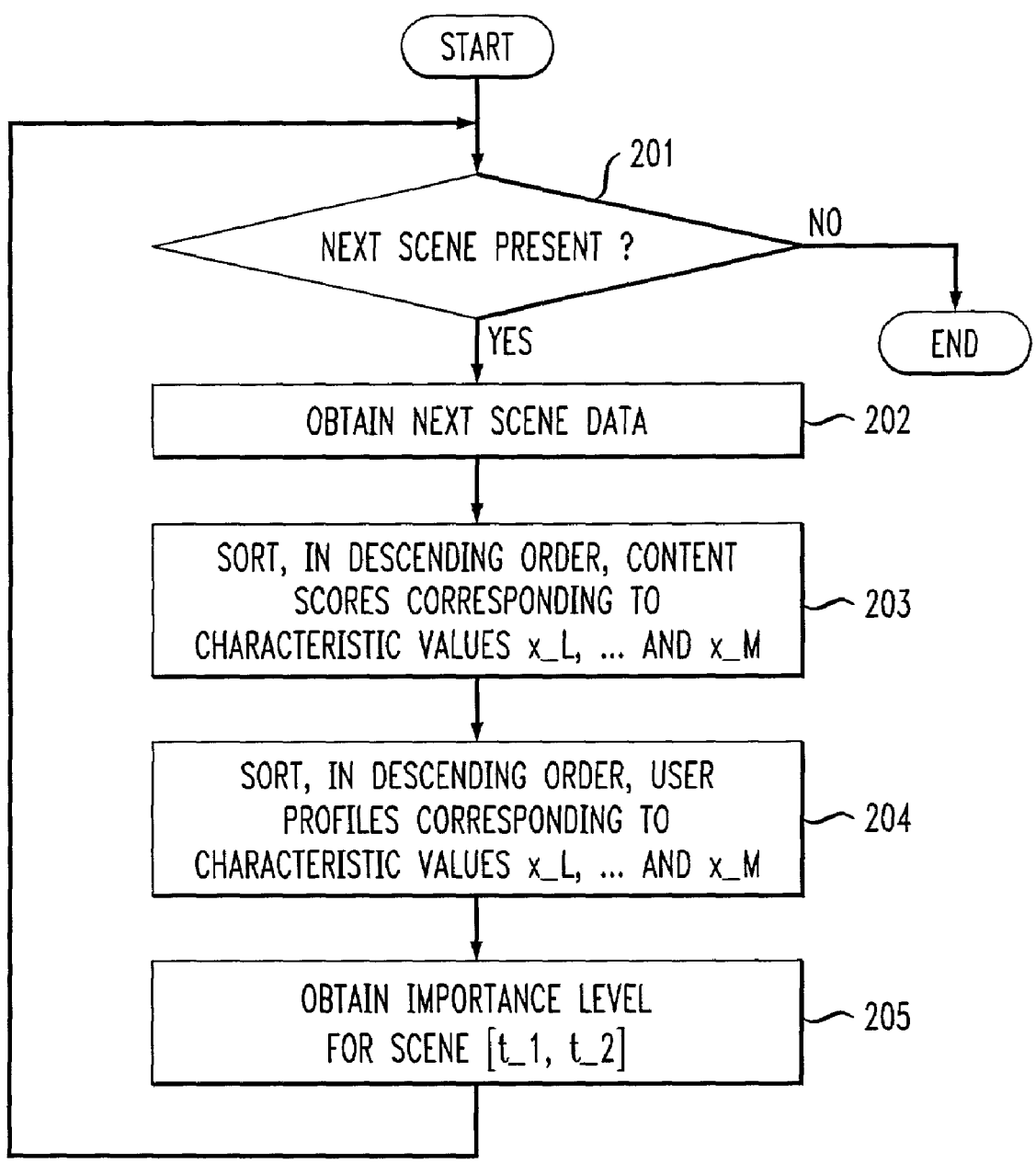
FIG. 7 is a flowchart showing an importance level calculation process, in accordance with a preferred embodiment of the invention.

FIG. 7 is a flowchart showing the importance level calculation processing (step 103 in FIG. 2), best explained while referring to FIG. 6. The importance level calculator 34 of the digest server 30 determines whether, after a specific scene has been processed, the next scene is present (step 201). If a next scene is not present, the processing is terminated. But when a next scene is present, the next scene data is obtained (step 202). And when meta data characteristics (x_L, . . . , x_M), which are characteristic values, are present in specific scenes at times [t1, t2], determined content scores (cs_ipL, . . . cs_ipM) corresponding to the characteristic values are sorted in the descending order (step 203). It should be noted that "ip" represents the p-th content i. Further, the user profile content scores (u_jL, . . . , u_jM) corresponding to the characteristic values are thereafter sorted in the descending order (step 204). The user profiles content scores and the determined content scores that are sorted are respectively represented as (u_j[1], i_j[2], . . . ) and (cs_ip[1], cs_ip[2], . . . ). At this time, the video importance levels for scenes [t1, t2] are obtained in order beginning with the first video importance level, imp(t1, t2) [1], and the second video importance level, imp(t1, t2)[2], and are represented as follows (step 205):

$$imp\,(t1,t2)[1] = \qquad (1)$$
$$(w*u\_j[1] + (1-w)*cs\_j[1])*\log(1/P(x\_L, \ldots, x\_M)),$$

-continued
$$imp\,(t1,t2)[2] = \qquad (2)$$
$$(w*u\_j[2] + (1-w)*cs\_j[2])*\log(1/P(x\_L, \ldots, x\_M)).$$

In these expressions, P(x_L, . . . x_M) denotes the probability at which meta data x_L, . . . , x_M are simultaneously generated in content. To obtain this probability, first, the content frequency CFreq_i is employed to calculate the generation probability P(x_i) for each characteristic in content as follows:

$$P(x\_i) = cf\_i \Big/ \sum_{j=1}^{N} cf\_j$$

Assuming that the characteristics occur independently, the simultaneous generation probability is P(x_i, x_j)=P(x_i)*P(x_j), and the coefficient log (1/P(x_L, . . . , x_M)) indicates the amount of information for each characteristic value. In the normal text process, the value of a meaningless word, such as noise, would be increased; however, the above process is effective for the meta data 22 having a specific quality as in this embodiment.

Further, weight w is determined in accordance with the reliability to the user profile 11 or when an audience clearly provides it. To obtain the weight in accordance with the reliability of the user profile 11, this reliability can be acquired by the following expression:

$$conf\_j = \sqrt{(u\_j1^2 + \ldots + u\_jN^2)}.$$

The reliability to the user profile 11 and its user provided content score represents the quality of the user profile 11, and is defined basically based on user's learning (the times for depressing the favorite scene registration button). Therefore, since it can be assumed that a user who learns his or her interest by using the favorite scene registration button, the reliability is defined based on the user profile 11. The obtained reliability (conf_j) is employed to obtain the weight w so that it is in proportion to the reliability, as shown by the following:

$$w \propto conf, 0 \le w \le 1.$$

At this time, w=0 corresponds to a case where the video importance level is determined without using the user profile 11 at all and by using only the content scores 37, and a typical video digest is presented unchanged. When w=1, the video digest is prepared without using the content score 37 and only by using the user profile 11, so that a completely personalized importance level can be obtained.

When there are intervals having the same importance level, not the max function but the max2 function is employed to calculate the video importance levels for these intervals, and these video importance levels are compared. It should be noted that the max2 function is a function for returning the second largest value. When the obtained values are still the same, the max3 function is employed to compare the video importance levels. This process is repeated. For example, when imp[t1, t2]=imp[t3, t4], $$imp2[t1,t2]=(w*u(1-w*cs)*\log(1/P(x\_L, \ldots, x\_M))'$$

where u=max2(u_jL, . . . , u_jM) and cs=max2(cs_ipL, . . . , cs_ipM) are calculated. Similarly, imp2[t3, t4] is calculated, and imp2[t1, t2] and imp2[t3, t4] need only be importance levels of time intervals [t1, t2] and [t3, t4].

An explanation will now be given for the video importance level entered by the operator of the content provider 20. For example, for the first content for which there are no contents in the past, or for a content for which no similar content is present, the content score 37 must be manually prepared by the operator of the content provider 20. However, since a great load is imposed to enter the score of each characteristic value and to watch the resultant content and correct the score again, in this embodiment, a system for easily generating the content score 37 is provided.

Figure 8:
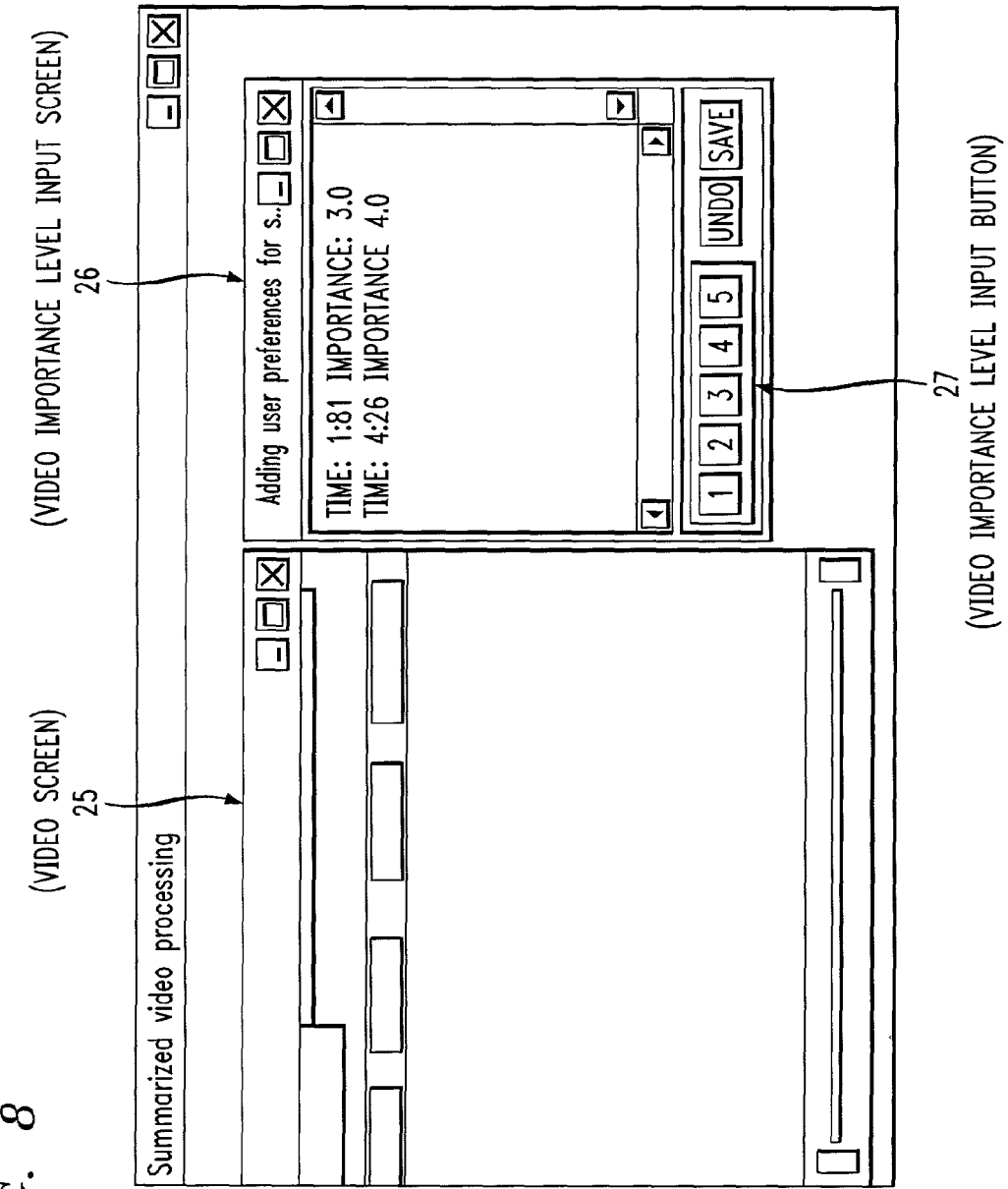
FIG. 8 is a diagram showing a display screen when the operator of a content provider enters a video importance level.

FIG. 8 is a diagram showing a display screen when the operator of the digest server 30 enters the video importance level. On the screen in FIG. 8, a video screen 25 and a video importance level input screen 26 are displayed. A video importance level input button 27 is provided for the video importance level input screen 26. The video importance level input button 27 can be, for example, a GUI tool using a slide bar or a button. While watching an image displayed on the video screen 25, the operator can easily enter the video importance level of each scene by using the video importance level input button 27. In this case, the process is inverted so that, when the determined content score 37 held by each characteristic value ($x\_i$) is denoted by $cs\_i$ the $cs\_1, \ldots$ and $cs\_N$ are obtained from the video importance level imp[t] entered by the operator. In this case, the minimum mean-square error estimation is employed to minimize the mean-square error between the importance level obtained by using expression (1) and the importance level imp[t] entered by the operator (it should be noted that w 0 and $cs=(cs\_ipL+ \ldots +cs\_ipM)/(M-L+1)$).

Figure 9:
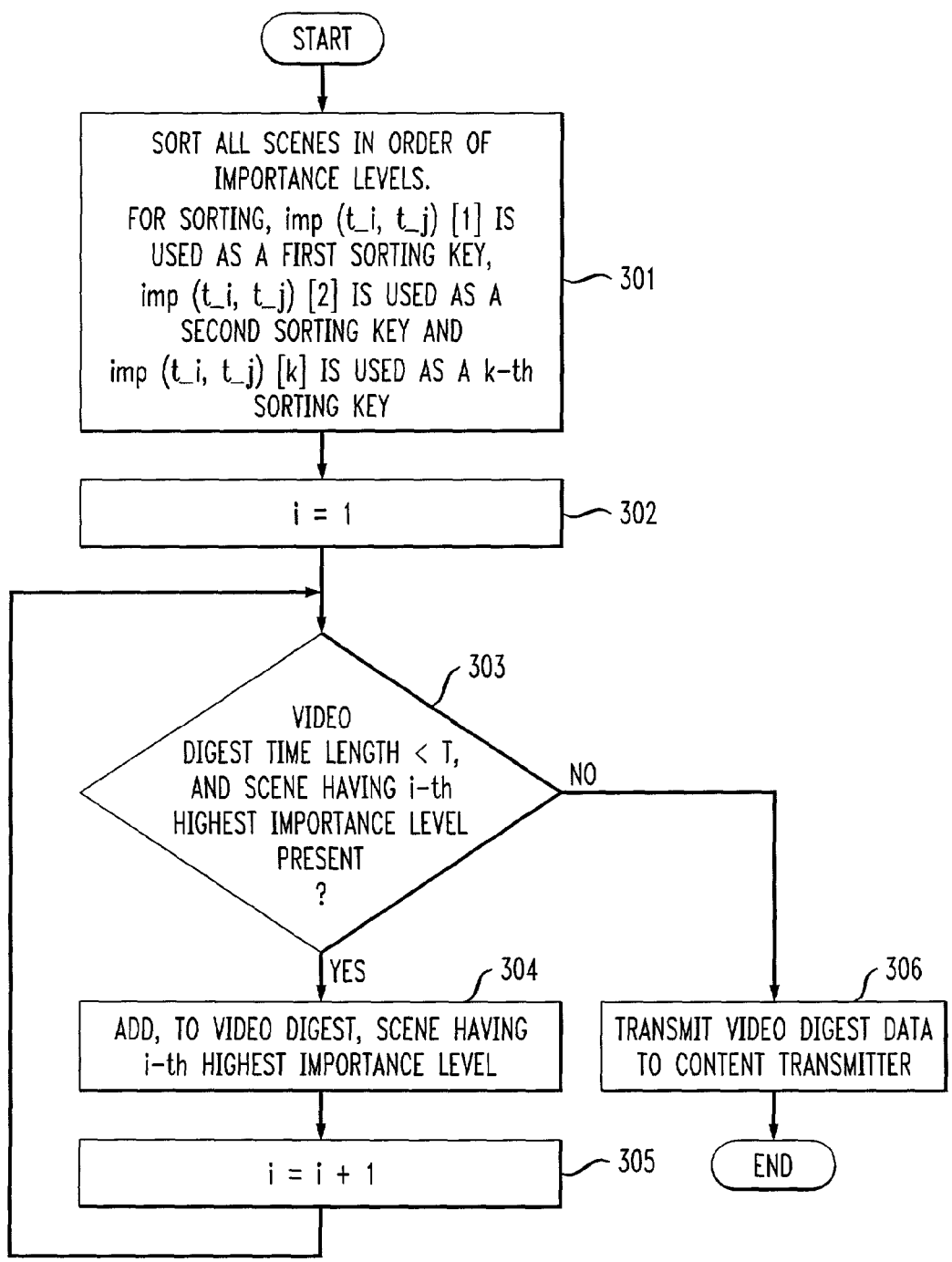
FIG. 9 is a detailed flowchart showing the video digest data generation process at step 104 in FIG. 2.

A preferred process for the generation of video digest data will now be described. FIG. 9 is a detailed flowchart for the video digest data generation process at step 104 in FIG. 2. The video digest data, which is generated by the video digest data generator 35 of the digest server 30, designate which original content scenes constitute video digest. When, for example, 0:10 to 0:15 (ten past twelve at midnight to fifteen past), 0:30 to 1:04 and 1:06 to 1:08 are designated, the video digest is constituted by scene [0:10, 0:15], scene [0:30, 1:04] and scene [1:06, 1:08] of the original video.

During the video digest data generation process, first, all the scenes are sorted in the order of their importance level (step 301). It should be noted that for sorting, imp(t-i, t_j) [1] is used as a first sorting key, imp(t-i, t-j) [2] is used as a second sorting key and imp(t_i, t_j) [k] is used as a k-th sorting key. Then, i=1 is set (step 302), and a check is performed to determine whether the video digest time length is less than T and the scene having the i-th highest importance level is present (step 303). When the decision is Yes, the scene having the i-th highest importance level is added to the video digest (step 304), and i is incremented by one (step 305). Program control thereafter returns to step 303. When the decision at step 303 is No, the video digest data is transmitted to the content transmitter 23 of the content provider 20 (step 306). The processing is thereafter terminated.

As is described above, the obtained importance levels, such as the first and second importance levels, are sorted in the descending order, as the first sorting key and the second sorting key, and the scenes, beginning with the one having the highest video importance level, that fall within the video digest time designated by the user are sequentially added, thereby generating the video digest. It should be noted, however, that the individual scenes in the video digest are preferably sorted not in the order of their video importance levels, but along the time axis of the scenes in the original video.

Figure 10:
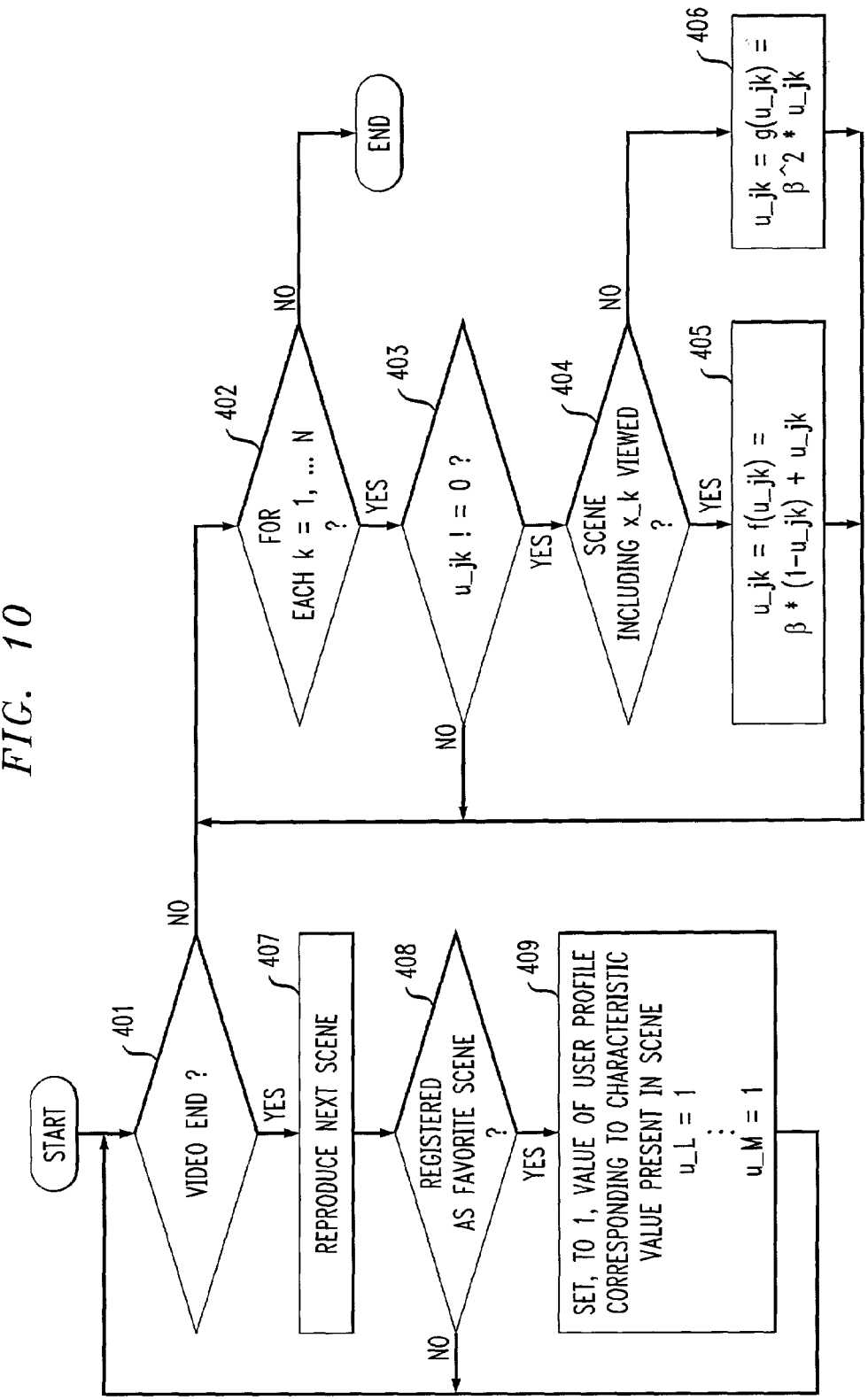
FIG. 10 is a flowchart showing the user viewing process at step 106 in FIG. 2, in accordance with a preferred embodiment of the invention.

The user viewing process performed by the client 10 will now be described. FIG. 10 is a flowchart showing the user viewing process at step 106 in FIG. 2. For this process, assume that the user profile 11 of an audience starts at UProf= ($u\_1, \ldots, u\_N$). First, a check is performed to determine whether the screening of the video has ended (step 401). When the screening of the video has not ended, a check is performed to determine whether k has been repeated for 1 to N (step 402). When k has been repeated, the processing is terminated. When k has not yet been repeated for 1 to N, a check is performed to determine whether $u\_jk$ in the user profile 11 is 0 (step 403). If $u\_jk$ is 0, program control returns to step 402. If $u\_jk$ is not 0, program control is shifted to step 404, and a check is performed to determine whether a scene including meta data $x\_k$ is being viewed. When the scene being viewed, the characteristic value is updated by using the above described expression (3) (step 405), and program control returns to step 402. When, at step 404, the scene including met data $x\_k$ is not being viewed, the characteristic value is updated by using the above described expression (4) (step 406), and program control returns to step 402.

When the video is ended at step 401, the next scene is reproduced (step 407). Then, a check is performed to determine whether this scene has been registered by the user as a favorite scene (step 408). When the scene has not registered, program control returns to step 401. When the scene has been registered, the value of the user profile 11 that corresponds to the characteristic value that is present in the pertinent scene is set to 1 (step 409). Program control thereafter returns to step 401.

FIG. 11 shows a diagram showing examples for the meta data characteristic value database 33, and the content frequency 36 and the determined content scores 37 of the content data 31, which are obtained through the above described processing. As is shown in FIG. 11, the characteristic values, for example, for anchorman M and ace pitcher U of team A, player S and pitcher H of team B, strike-outs, hits and home runs, are stored in the characteristic value database 33. Further, in FIG. 11, the content frequency 36 and the content score 37 are shown as the content data 31 for the thirteenth game between teams A and B. In FIG. 11, the simultaneous generation probability used for the importance level calculation expression is shown. The thus obtained simultaneous generation probability can be employed to calculate the video importance level in the manner explained while referring to FIG. 5, so that the video digest can be provided.

Figure 12:
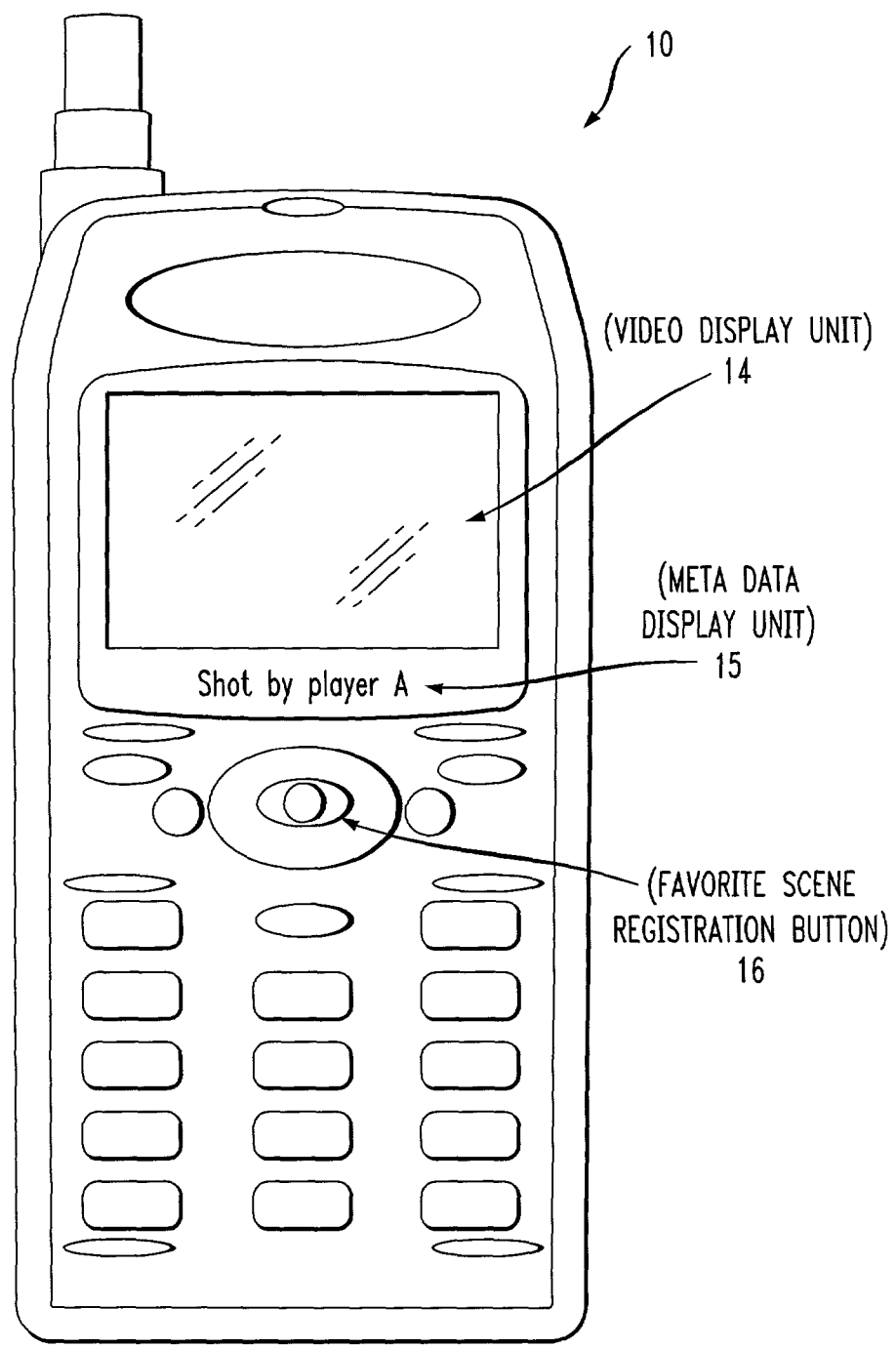
FIG. 12 is a diagram showing an example user terminal that serves as a client.

FIG. 12 is a diagram showing an example user terminal 10, the client 10. The user terminal in FIG. 12 is a portable telephone. The portable telephone comprises: a video display unit 14, for displaying a video digest on the screen of the portable telephone; a meta data display unit 15, for displaying the characteristic value of a specific scene in the video displayed on the video display unit 14; and a favorite scene registration button 16 used for preparing the user profile 11. When this button 16 is frequently depressed, as previously described, the quality of the user profile 11 is improved, and a reliable video digest can be provided for the user terminal.

Finally, a digest of a soccer broadcast is introduced as an example for which the embodiment is employed. When a user views a video the first time, no user profile 11 is available. When a user is to watch specific content 21, video digests, including multiple keywords that are representative of the individual content scores 37, can be selected. When a video digest that corresponds to the user's preferences is selected by the user, he or she can view the desired video digest. For example, when the user is a fan of team E, he or she need only select the video digest for which the name of a team E player is displayed as a keyword, for a video digest for the fans of team E to be reproduced. If the user finds a preferred scene while watching the video, the user need only depress the favorite scene registration button 16 in FIG. 12 to register, in the user profile 11, the meta data characteristic(s) included in the scene. Further, the user profile 11 can be updated through the updating process performed at the end of each viewing. Through this registration process, the reliability of the user profile 11 is increased. When the user views the video the next time, a personal video digest appropriate for the user can be prepared so long as the quality of the user profile 11 is high. And even when the quality of the user profile 11 is low, the user need only select one of the video digests to view one he or she prefers.

Each time the content 21 is viewed, the content provider 20 employs the user profile 11 of an audience to update the content score 37. And when new content is obtained, the determined content scores 37 of the previously accumulated contents 21 are employed to generate several types of representative determined content scores 37. In accordance with the thus obtained content scores 37, R characteristic values having high content scores are presented as indexes that serve as keywords for the selection of video digests. Thereafter, the determined content scores 37 are updated based on user profiles 11 prepared for the audience, so that the quality of the determined content scores 37 can be improved.

As is described above, according to the embodiment, scores for meta data 22 are calculated based on similarities between contents 21 and audience user profiles 11, so that several types of typical video digests can be automatically generated, and so that users, clients 10, are able to select preferred video digests. In addition, a user, one of the clients 10, can generate a personal video digest by using a user profile 11. Further, when the reliability of a user profile 11 is low, one to several video digests can be presented as the content 21, so that a user can select a preferred and satisfactory video digest. Furthermore, a personal video digest can be obtained by combining a user profile 11 and a video digest provided by the content provider 20.

In the above explanation based on FIG. 1, the user profile 11 has been provided for the client 10; however, the user profile 11 may be provided for the digest server 30. In this case, the client 10 transmits, to the digest server 30, time data that is registered as preferred data, and the digest server 30 performs the registration and updating of the user profile 11. Further, the importance level calculator 34 and/or the video digest data generator 35 of the digest server 30 may also be provided for the client 10. In this case, the client 10 may output, to the digest server 30, a request for the selected content score 37, may receive the content score 37 from the digest server 30, may perform the importance level calculation and the video digest data generation, and may then transmit the generated video digest data to the content provider 20. Moreover, the content provider 20 and the digest server 30 can be constituted at the same site, or only part of the components of the digest server 30 may be provided for the content provider 20. That is, the hardware configuration of the system is not limited to that employed for the embodiment.

As is known in the art, the present invention may be implemented as a computer-readable program, which permits a computer to perform the following steps: (1) using a characteristic value for meta data to represent each of multiple scenes that constitute content, wherein each scene corresponds to at least one characteristic value; (2) calculating frequencies, each frequency indicating how many times a characteristic value of the meta data appears in the content; (3) calculating a video importance level for each scene based on a probability and based on a determined content score for the scene, a user profile content score for the scene, or both the determined content score and the user profile content score, wherein the probability is determined from at least one of the frequencies; (4) selecting a predetermined number of scenes, based on the obtained video importance level; and (5) generating a video digest from the predetermined number of scenes. Additionally, a computer program or article of manufacture may be made that permits a compute to perform step (1)-(5) above. Additionally, a computer program or article of manufacture, which permits a computer to perform steps or functions, may be made to perform the following: (1) a function for confirming a preference of a user relative to a scene that constitutes a displayed video digest; (2) a function for generating, based on the confirmation, or updating a user profile that corresponds to a characteristic value included in the scene; and (3) a function for transmitting the user profile.

It will be apparent to those skilled in the art that various modifications may be made in the method and circuits illustratively described therein, without departing from the spirit or scope of the invention as expressed in the following claims.

What is claimed is:

1. A content digest system comprising:
a content provider comprising content, wherein the content provider furnishes content and meta data describing the content to a digest server;
the digest server comprising a content digest for the content, wherein the digest server converts the meta data into characteristic values, wherein the digest server calculates an importance level for each of a plurality of content segments, wherein each of the plurality of content segments correspond to at least one of the characteristic values, and wherein the digest server generates the content digest by using the importance levels, the content digest comprising at least two of the content segments sorted along a time axis based on said importance level, wherein said importance level is a degree of importance; and
a client, wherein the client receives the content digest, wherein the client includes a user profile having user profile content scores for at least one viewed content segment for a user, and wherein the digest server calculates importance levels for the at least one viewed content segment based on a probability and based on a current determined content score for the at least one viewed content segment, a user profile content score for the at least one viewed content segment, or both the current determined content score and the user profile content score, wherein the probability is determined from at least one of a plurality of frequencies, each of the frequencies indicating how often a characteristic value occurs in the content segment.

2. The content digest system according to claim 1, wherein the digest server uses determined content scores, which correspond to characteristic values, for each of the content segments to determine the importance levels.

3. The content digest system according to claim 2, wherein the digest server determines said current determined content score for a current content segment based on determined content scores for similar content segments, the similar content segments determined through a measure comparing frequencies of a plurality of characteristic values for the current content segment with frequencies of a plurality of characteristic values for previously shown content segments.

4. A content digest system, for preparing a predetermined digest for content provided by a content provider and for providing the predetermined digest, comprising:
importance level estimation means, for estimating an importance level for each of a plurality of content segments, wherein said importance level is a degree of importance;

profile identification means for identifying a user profile of a user who has received content; and update means for updating, based on the user profile, the importance level of at least one of the plurality of content segments, wherein said predetermined digest comprises at least two of the plurality of content segments sorted along a time axis based on said importance level, wherein the importance level estimation means calculates importance levels for the at least one content segment based on a probability and based on the current determined content score for the at least one content segment, a user profile content score for the at least one content segment, or both the current determined content score and the user profile content score, wherein the probability is determined from at least one of a plurality of frequencies, each of the frequencies indicating how often a characteristic value occurs in the content segment.

5. The content digest system according to claim 4, wherein importance level estimation means uses content determined content scores for each of the content segments to determine the importance level, and wherein the digest server determines current determined content scores for a current content segment based on determined content scores for similar content segments, the similar content segments determined through a measure comparing frequencies of a plurality of characteristic values for the current content segment with frequencies of a plurality of characteristic values for previously accumulated shown content segments.

6. A video digest system for providing a video digest for a user comprising:

a meta data characteristic value database adapted to store characteristic values obtained from meta data included in video content;

an importance level calculator adapted to estimate an importance level for each of a plurality of scenes in the video content, and adapted to determine the importance level for a scene based on a probability and based on a determined content score for the scene, a user profile content score for the scene, or both the determined content score and the user profile content score, wherein said importance level is a degree of importance, wherein the probability is determined from at least one of a plurality of frequencies, each of the frequencies indicating how often a characteristic value occurs in the content segment; and a video digest data generator, for selecting, based on the importance levels, a predetermined number of scenes, for sorting the selected scenes along a time axis based on the importance levels, and for generating video digest data.

7. The video digest system according to claim 6, wherein the importance level calculator uses only the determined content scores for a current scene, and wherein the importance level calculator determines the importance for the scene based on determined content scores for similar scenes, the similar scenes determined through a measure comparing frequencies of a plurality of characteristic values for the current scene with frequencies of a plurality of characteristic values for previously shown scenes.

8. The video digest system according to claim 6, wherein the importance level calculator receives a user profile for a user for whom the video digital data is provided, and solely employs the user profile, comprising the user profile content scores, to calculate the importance level for each of the scenes.

9. The video digest system according to claim 6, wherein the video digest data generator defines a threshold value based on the length of the time required for a video digest and sorts along a time axis the scenes that are selected based on the importance levels and the threshold value, and thereby provides a video digest.

10. A user terminal comprising:

pre-viewing transmission means, for transmitting information for predetermined content that is selected by a user from a received content list, and in accordance with a video digest time length desired by the user;

reception means, for receiving, following the reception of the information and the time length, a video digest and meta data from a content provider, wherein said video digest is created based on a processor-generated importance level for each of a plurality of content segments, wherein said processor-generated importance level is a degree of importance and wherein the video digest comprises at least two of the plurality of content segments sorted along a time axis based on said processor-generated importance level, wherein a user profile has user profile content scores for at least one viewed content segment for a user, and wherein a processor-generated importance level is created for the at least one viewed content segment based on a probability and based on a current determined content score for the at least one viewed content segment, a user profile content score for the at least one viewed content segment, or both the current determined content score and the user profile content score, wherein the probability is determined from at least one of a plurality of frequencies, each of the frequencies indicating how often a characteristic value occurs in the content segment; and post-viewing transmission means for transmitting results that are obtained from the user who has viewed and listened to the video digest.

11. The user terminal according to claim 10, wherein the result information transmitted by the post-viewing transmission means is a user profile identifying the user's preferences.

12. A video digest generation method comprising the steps of:

using a characteristic value for meta data to represent each of multiple scenes that constitute content, wherein each scene corresponds to at least one characteristic value;

calculating frequencies, each frequency indicating how many times a characteristic value of the meta data appears in the content;

calculating a video importance level for each scene based on a probability and based on a determined content score for the scene, a user profile content score for the scene, or both the determined content score and the user profile content score each of the frequencies indicating how often a characteristic value occurs in the content, wherein the probability is determined from at least one of the frequencies, wherein said video importance level is calculated by a processor, and wherein said video importance level is a degree of importance;

selecting a predetermined number of scenes, based on the obtained video importance level; and generating a video digest from the predetermined number of scenes, wherein the predetermined number of scenes are sorted along a time axis based on said video importance level.

13. The video digest generation method according to claim 12, further comprising the step of:

estimating a determined content score for a current scene based on similarity to previously accumulated determined content scores for previously shown scenes, the similar content segments determined through a measure comparing frequencies of a plurality of characteristic values for the current content segment with frequencies of a plurality of characteristic values for the previously shown scenes.

14. The video digest generation method according to claim 12, wherein the determined content scores are based on user profiles obtained for multiple users who have viewed and listened to the video digest.

15. The video digest generation method according to claim 12, wherein the video digest is generated by selecting a predetermined number of scenes based on a video digest time length received from a user to whom the video digest is to be distributed.

16. A video digest reception method comprising the steps of:
transmitting a user profile that includes information for content desired by a user, information for a video digest time length for viewing and listening; and
receiving a video digest comprising multiple scenes, sorted along a time axis based on a processor-generated importance level, that constitute content that reflects the video digest time length, and meta data included in each of the scenes, wherein said video digest is created based on said processor-generated importance level for each of a plurality of content segments, and wherein said importance level is a degree of importance, wherein each importance level is based on a probability and based on a current determined content score for at least one viewed content segment, a user profile content score for the at least one viewed content segment, or both the current determined content score and the user profile content score, wherein the probability is determined from at least one of a plurality of frequencies, each of the frequencies indicating how often a characteristic value occurs in the content segment.

17. The video digest reception method according to claim 16, further comprising a step of transmitting information that is obtained from the user as a result of viewing and listening to the video digest.

* * * * *